(12) United States Patent
Radtke et al.

(10) Patent No.: US 11,394,280 B2
(45) Date of Patent: Jul. 19, 2022

(54) DEVICE FOR BENDING WINDING SEGMENTS TO FORM A WINDING

(71) Applicant: CONTINENTAL AUTOMOTIVE GMBH, Hannover (DE)

(72) Inventors: Christoph Radtke, Berlin (DE); Axel Gohs, Berlin (DE)

(73) Assignee: Vitesco Technologies GmbH, Hannover (DE)

( * ) Notice: Subject to any disclaimer, the term of this patent is extended or adjusted under 35 U.S.C. 154(b) by 721 days.

(21) Appl. No.: 15/301,009

(22) PCT Filed: Mar. 30, 2015

(86) PCT No.: PCT/EP2015/056871
§ 371 (c)(1),
(2) Date: Sep. 30, 2016

(87) PCT Pub. No.: WO2015/150314
PCT Pub. Date: Oct. 8, 2015

(65) Prior Publication Data
US 2017/0025932 A1    Jan. 26, 2017

(30) Foreign Application Priority Data
Apr. 1, 2014   (DE) .................. 10 2014 206 105.9

(51) Int. Cl.
*H02K 15/00* (2006.01)
*H02K 15/04* (2006.01)

(52) U.S. Cl.
CPC ..... *H02K 15/0087* (2013.01); *H02K 15/0031* (2013.01); *H02K 15/0421* (2013.01);
(Continued)

(58) Field of Classification Search
CPC ........... H02K 15/0031; H02K 15/0087; H02K 15/0428; H02K 15/0421; H02K 15/064;
(Continued)

(56) References Cited

U.S. PATENT DOCUMENTS 6,425,175 B1    7/2002  Sawada et al.
6,557,239 B2 *  5/2003  Takahashi ............ H02K 15/064
                                                29/596

(Continued)

FOREIGN PATENT DOCUMENTS

CN          101350547 A    1/2009
CN          103314508 A    9/2013
(Continued)

OTHER PUBLICATIONS

Wrobel et al, Additive Manufacturing in Construction of Electrical Machines—A Review, IEEE Workshop on Electrical Machines Design, Control, and Diagnosis, vol. 1, 2019, pp. 15-22. (Year: 2019).*
(Continued)

*Primary Examiner* — A. Dexter Tugbang

(57) ABSTRACT

A device for bending a plurality of winding segments to form a winding of a winding carrier of an electric machine is provided. The device includes: a holding device designed for holding in place the winding carrier in which the winding segments are arranged; a main bending device, including a number of main locking elements, which point towards the holding device, are arranged along first sections of a circumferential line and are designed to lock exposed end sections of first winding segments; and a partial bending device, including a number of partial locking elements, which point towards the holding device, are arranged along second sections of the circumferential line and are designed to lock exposed end sections of second winding segments. The holding device on the one hand and the main bending
(Continued)

device and the partial bending device on the other hand are rotatable relative to each other.

8 Claims, 5 Drawing Sheets

(52) U.S. Cl.
CPC .... *H02K 15/0428* (2013.01); *Y10T 29/49009* (2015.01); *Y10T 29/49012* (2015.01); *Y10T 29/49073* (2015.01)

(58) Field of Classification Search
CPC ......... Y10T 29/49009; Y10T 29/49012; Y10T 29/49073
See application file for complete search history.

(56) References Cited

U.S. PATENT DOCUMENTS

| | | |
|---|---|---|
| 2003/0121139 A1 | 7/2003 | Katou et al. |
| 2005/0166393 A1* | 8/2005 | Sawada ............. H02K 15/0428 29/732 |
| 2009/0302705 A1 | 12/2009 | Guercioni |
| 2012/0262012 A1* | 10/2012 | Kubes ............... Y10T 29/49009 310/54 |
| 2013/0276295 A1* | 10/2013 | Guercioni .......... H02K 15/0428 29/596 |

FOREIGN PATENT DOCUMENTS

| | | |
|---|---|---|
| CN | 103518316 A | 1/2014 |
| DE | 60306850 T2 | 9/2007 |
| EP | 2661801 A1 | 11/2013 |
| JP | 2008079353 A * | 4/2008 |
| KR | 20130130519 A | 12/2013 |

OTHER PUBLICATIONS

International Search Report and Written Opinion dated Sep. 2, 2015 from corresponding International Patent Application Mo. PCT/EP2015/056871.
German Office Action dated Mar. 26, 2015 for corresponding German Patent Application No. 10 2014 206 105.9.

* cited by examiner

DEVICE FOR BENDING WINDING SEGMENTS TO FORM A WINDING

TECHNICAL FIELD

The present disclosure relates to an apparatus and to a method for bending a large number of winding segments for forming a winding of a winding support, that is to say a stator or a rotor, of an electrical machine. A winding support and an electrical machine including a winding support of said kind are also provided.

BACKGROUND

Electrical machines have winding supports that have a laminated core, together with windings that are inserted into the laminated core, and are in the form of stators or rotors of the electrical machines. The windings may be formed from a large number of winding pins that are of hairpin-shaped or U-shaped design and each has two limbs as winding segments.

In order to form windings, the two winding segments of the respective winding pin are interleaved and interlocked by a spreading step by means of a winding step of the winding support. As such, the two winding segments of each individual winding pin may be inserted into corresponding pole slots, which are provided for them, of the laminated core in line with the winding step of the winding support.

Exposed regions, which protrude from the laminated core, of winding segments of most of the winding pins, which are provided for forming windings and are therefore directly electrically connected to exposed regions of winding segments of corresponding winding pins, which are arranged such that they are spaced apart in line with the winding step, are then interleaved and electrically connected to the corresponding, likewise interleaved, regions of the winding segments of the corresponding winding pins.

Exposed regions of winding segments of the remaining, selected winding pins, which are further provided, in addition to the abovementioned function for forming windings, for interleaving the windings to form current phases or for establishing electrical connections from the windings to an external current source or a power electronics system by phase input or phase output, are otherwise interleaved and electrically connected to the external current lines.

The bent bending regions of the winding segments then form a winding head of the winding support of the electrical machine. In order to construct an electrical machine such that as much installation space as possible is saved while retaining the same power density, the overall height of the winding head of the electrical machine has to be kept as small as possible.

As an alternative, bar or I-like winding bars are also provided, said winding bars, unlike above-described winding pins, first being inserted into the corresponding pole slots as far as in each case two exposed end regions and then being interleaved at the respective two end regions. Therefore, both the winding pins and also the winding bars form plug-type windings.

As is customary in the case of technical components, there is additionally a general requirement in electrical machines for said electrical machines to be produced as far as possible in a cost-effective manner using a simple production process. In particular, this requirement is very important in the automotive sector.

SUMMARY

Consequently, the object of the present disclosure is to provide a simple and cost-effective way of being able to produce a winding support and therefore an electrical machine in an installation space-saving manner.

One aspect of the disclosure provides an apparatus for bending a large number of winding segments for forming a winding or a plug-type winding of a winding support, that is to say a stator or a rotor, of an electrical machine. The apparatus includes a holding device which is designed to firmly hold the winding support in which the winding segments are arranged.

The apparatus further includes a main bending device. The main bending device includes a number of main locking elements which face the holding device. The main locking elements are arranged along first sections of a circumferential line which runs around an axis. The main locking elements are designed to lock exposed end sections of a first group of the winding segments.

The apparatus further includes a partial bending device. The partial bending device includes a number of partial locking elements which likewise face the holding device. The partial locking elements may be arranged along second sections of the circumferential line and are designed to lock exposed end sections of a second group of the winding segments.

Implementations of the disclosure may include one or more of the following optional features. In some implementations, the holding device on the one hand and the main bending device and the partial bending device on the other hand are designed such that they can rotate in relation to one another. By splitting the bending device into a main bending device and a partial bending device, it is possible to interleave or to bend the winding segments in accordance with their functions in such a way that they can be bent by the same ultimate bending angle in relation to the cross-sectional plane of the winding support but with different bending lengths.

In some examples, the bending length means a length of a bending region of a winding segment, which bending region forms the bent section of the winding segment after the bending process on the winding segment.

The same bending angle allows the winding segments to be able to be bent even further than winding segments with different bending angles. This in turn allows a low overall height for the winding head.

Different bending lengths for the winding segments allow the winding segments, which are provided, depending on their functions, for forming windings or for establishing electrical connections with an external current source or a power electronics system, to be able to each be electrically connected to corresponding winding segments or to external current lines in a simple manner in a subsequent production phase of the winding support.

In some implementations, owing to the design of the holding device on the one hand and the main bending device and the partial bending device on the other hand such that they may rotate in relation to one another, it is possible to rotate either the exposed end sections of the bending regions or of the winding segments with respect to the winding support or, conversely, to rotate the winding support with respect to the end sections and, in the process, to bend the winding segments.

The abovementioned first and second sections of the circumferential line form regions of the circumferential line which are disjointed in relation to one another. Accordingly, the first and the second group of winding segments do not form an intersection set. In other words, a winding segment belongs either to the first group of winding segments or to the second group of winding segments.

The apparatus may be produced in a simple and cost-effective manner per se. In addition, an apparatus of this kind is easy to operate. Consequently, the winding support and therefore also electrical machines including the apparatus may be produced in a simple, cost-effective and additionally installation space-saving manner.

In some implementations, the holding device and the main bending device are designed such that they can rotate bidirectionally in relation to one another.

Owing to the bidirectional rotation in relation to one another, the holding device and the main bending device may bidirectionally bend the first group of the winding segments. This may make it easier to interleave and/or bend the first and the second group of winding segments by the same ultimate bending angle but with different bending lengths, as described above.

The holding device and the partial bending device are also preferably designed such that they may rotate bidirectionally in relation to one another. In some examples, the holding device and the partial bending device are designed such that they can rotate unidirectionally in relation to one another.

Owing to the unidirectional rotation in relation to one another, the holding device and the partial bending device may only unidirectionally bend the second group of the winding segments. This has the advantage that the second group of winding segments, which are intended to be bent only in one bending direction in any case, are not incorrectly bent in an opposite, incorrect bending direction.

In some examples, the circumferential line is in the shape of an ellipse, wherein the axis passes through the center of the ellipse. The circumferential line may be in the shape of a circle, where the axis passes through the center of the circle.

The main locking elements and/or partial locking elements may be in the form of gripping elements or in the form of recesses into which the end sections of the winding segments can be inserted such that they fit.

A locking element is in the form of a recess allows simple passive locking of a winding segment or the end section of said winding segment with a small amount of freedom of movement.

In some implementations, the apparatus includes a rotary drive device that is designed to rotate the holding device, the main bending device and/or the partial bending device in relation to one another about the axis.

In some examples, the apparatus includes a linear drive device designed to move the holding device, the main bending device and/or the partial bending device independently of one another in the direction of the axis.

Another aspect of the disclosure provides a method for bending a large number of winding segments for forming a winding of a winding support of an electrical machine. The method includes the following method steps:

First, exposed end sections of first winding segments are locked.

Then, the first winding segments are bent at respective bending regions in a first bending direction along a circumferential line.

After this, the end sections of the first winding segments are further locked and bent at the respective bending regions in a second bending direction, which is opposite to the first bending direction, along the circumferential line.

In some examples, after the first winding segments are bent in the first bending direction, exposed end sections of second winding segments are also locked in addition to the first winding segments. In the subsequent bending process, both the first and also the second winding segments may be bent at respective bending regions in the second bending direction along the circumferential line.

Owing to the above-described method, the first and the second winding segments may be bent in a simple manner by the same ultimate bending angle but with different bending lengths.

In some implementations, the first and the second winding segments are bent along an ellipsoidal, in particular a circular, circumferential line.

The first and/or the second winding segments may be locked by inserting respective exposed end sections into respective recesses that firmly hold the corresponding end sections during the bending process.

Yet another aspect of the disclosure provides a winding support, that is to say a rotor or a stator, for an electrical machine. The winding support includes a first group of winding segments for forming windings. The winding support further includes a second group of winding segments which, in addition to forming the windings, are further provided for interleaving the windings to form current phases and/or for establishing electrical connections from the windings or the current phases to an external current source. The current phases are, for example, the U, V, and W phases of a stator of an electrical machine.

The winding segments of the first group each have a first, exposed bending region. The first bending region may be directly electrically connected to a bending region of another corresponding winding segment. Here, a "direct electrical connection" means an electrical connection, which is established without interposed winding segments. A connection of this kind is established, for example, by means of soldering or welding connection and possibly by means of an electrically conductive web that has been positioned between the two bending regions that are to be connected to one another.

The winding segments of the second group may each have a second, exposed bending region. In some examples, the second bending region is directly electrically connected to an electrical line that leads to an external current source or is provided for interleaving the windings to form current phases. An electrical line is in the form of, for example, a busbar or a current cable. A "direct electrical connection" means an electrical connection that is established without interposed winding segments here too. A connection of this kind is established, for example, by means of soldering or welding connection and possibly by means of an electrically conductive web that has been positioned between the second bending region and the electrical line. In some implementations, the first bending region and the second bending region are bent by the same bending angle. In some examples, the winding support is produced in line with the above-described method.

Another aspect of the disclosure provides an electrical machine having an above-described winding support, where the winding support is in the form of a stator or a rotor of the electrical machine.

Advantageous refinements of the above-described apparatus, insofar as they can otherwise be transferred to the above-described method, to the above-described winding support or to the abovementioned electrical machine, can also be regarded as advantageous refinements of the method, of the winding support and, respectively, of the electrical machine.

The details of one or more implementations of the disclosure are set forth in the accompanying drawings and the description below. Other aspects, features, and advantages will be apparent from the description and drawings, and from the claims.

DESCRIPTION OF DRAWING

Like reference symbols in the various drawings indicate like elements.

DETAILED DESCRIPTION

Figure 1:
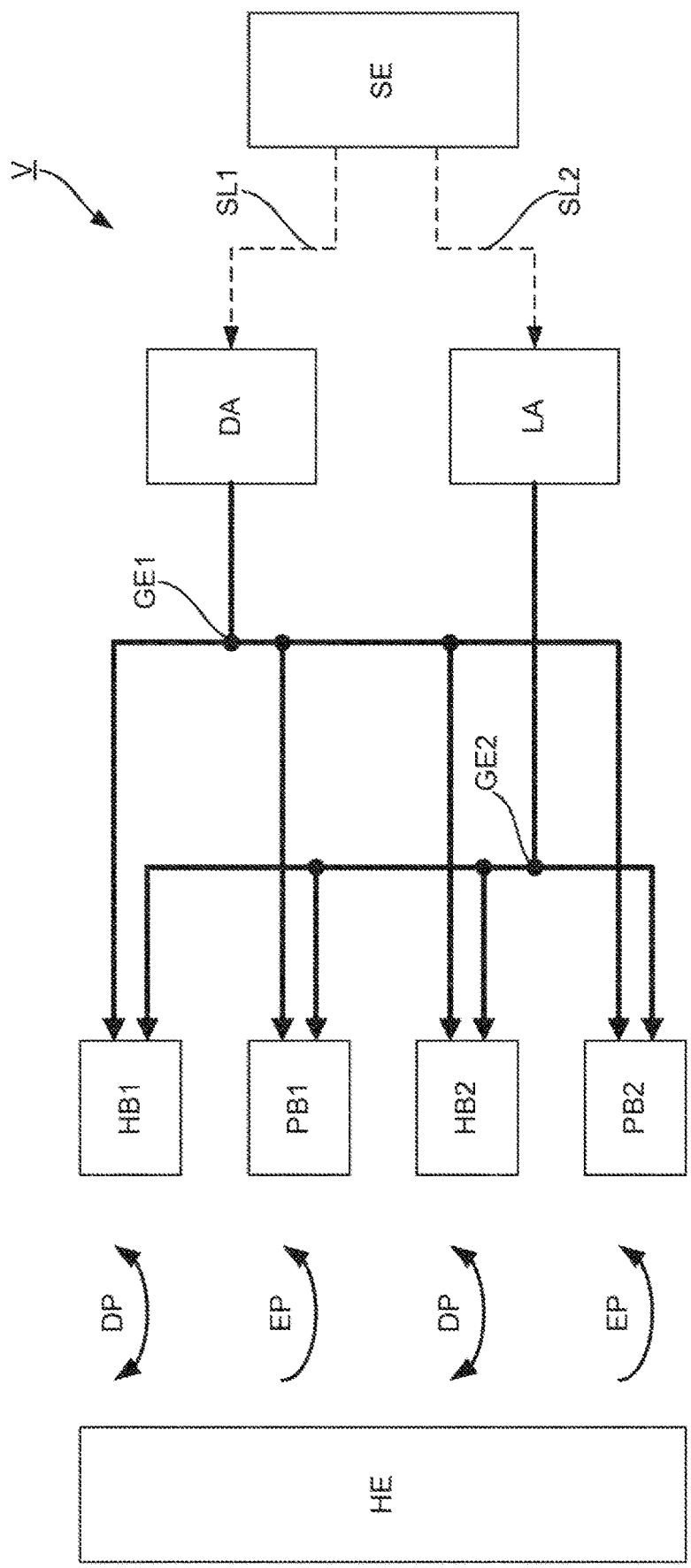
FIG. 1 is a schematic view of an exemplary apparatus for bending winding segments.

FIG. 1 schematically shows an apparatus V for bending winding segments WS1, WS2 of a winding support WT (see FIGS. 4A-4D), for example a stator, of an electrical machine, not illustrated in the figure. The apparatus V includes a holding device HE designed to firmly hold a winding support WT together with winding segments WS1, WS2 arranged in the winding support WT.

In some examples, the apparatus V further includes a first main bending device HB1, a first partial bending device PB1, a second main bending device HB2 and a second partial bending device PB2. The first and the second main bending devices HB1, HB2 are designed such that they may be bidirectionally rotated in relation to the holding device HE and about a rotation axis AS (see FIG. 2), as illustrated in FIG. 1 by a double-headed arrow DP.

The first and the second partial bending devices PB1, PB2 may be designed such that they can be unidirectionally rotated in relation to the holding device HE and about the rotation axis AS, as illustrated in FIG. 1 by a single-headed arrow EP. Therefore, the two main bending devices HB1, HB2 are also designed such that they can be bidirectionally rotated in relation to the two partial bending devices PB1, PB2. Similarly, the two partial bending devices PB1, PB2 are designed such that they can be unidirectionally rotated in relation to the two main bending devices HB1, HB2.

In addition, in some implementations, the main bending devices HB1, HB2 and the partial bending devices PB1, PB2 are designed such that they can be moved independently of one another and in relation to the holding device HE in the direction of the rotation axis AS.

The apparatus V may additionally include a rotary drive device DA designed to rotate the two main bending devices HB1, HB2 and also the two partial bending devices PB1, PB2 independently of one another about the rotation axis AS and therefore bidirectionally and, respectively, unidirectionally in relation to the holding device HE.

In some examples, the apparatus V includes a first transmission device GE1 that mechanically connects the rotary drive device DA selectively to one or more of the two main and of the two partial bending devices HB1, HB2, PB1, PB2 for transmitting kinetic energy.

During operation of the apparatus V, the rotary drive device DA generates kinetic energy by means of first drive actuators, not illustrated in the figure. The kinetic energy is transmitted to the respective main and partial bending devices HB1, HB2, PB1, PB2 by means of the first transmission device GE1 and prompting the respective main and partial bending devices HB1, HB2, PB1, PB2 to rotate in a bidirectional and, respectively, unidirectional manner.

In some implementations, the apparatus V includes a linear drive device LA designed to move the two main bending devices HB1, HB2 and the two partial bending devices PB1, PB2 independently of one another in the direction of the rotation axis AS and therefore in relation to the holding device HE.

The apparatus V may include a second transmission device GE2 that mechanically connects the linear drive device LA selectively to one or more of the two main and of the two partial bending devices HB1, HB2, PB1, PB2 for transmitting kinetic energy.

During operation of the apparatus V, the linear drive device LA generates kinetic energy by means of second drive actuators, not illustrated in the figure. The kinetic energy is transmitted to the respective main and partial bending devices HB1, HB2, PB1, PB2 by means of the second transmission device GE2 and prompting the respective main and partial bending devices HB1, HB2, PB1, PB2 to move axially in the direction of the rotation axis AS.

The apparatus V may further include a control device SE that is electrically connected at the output end to the rotary drive device DA via a first signal line SL1 and to the linear drive device LA via a second signal line SL2.

In some implementations, during operation of the apparatus V, the control device SE sends a control signal to the rotary drive device DA via the first signal line SL1 and prompts and rotary drive device DA to rotate the respective main and partial bending devices HB1, HB2, PB1, PB2. During operation of the apparatus V, the control device SE may send a control signal to the linear drive device LA via the second signal line SL2 and prompts the linear drive device LA to move the respective main and partial bending devices HB1, HB2, PB1, PB2 axially.

Figure 2:
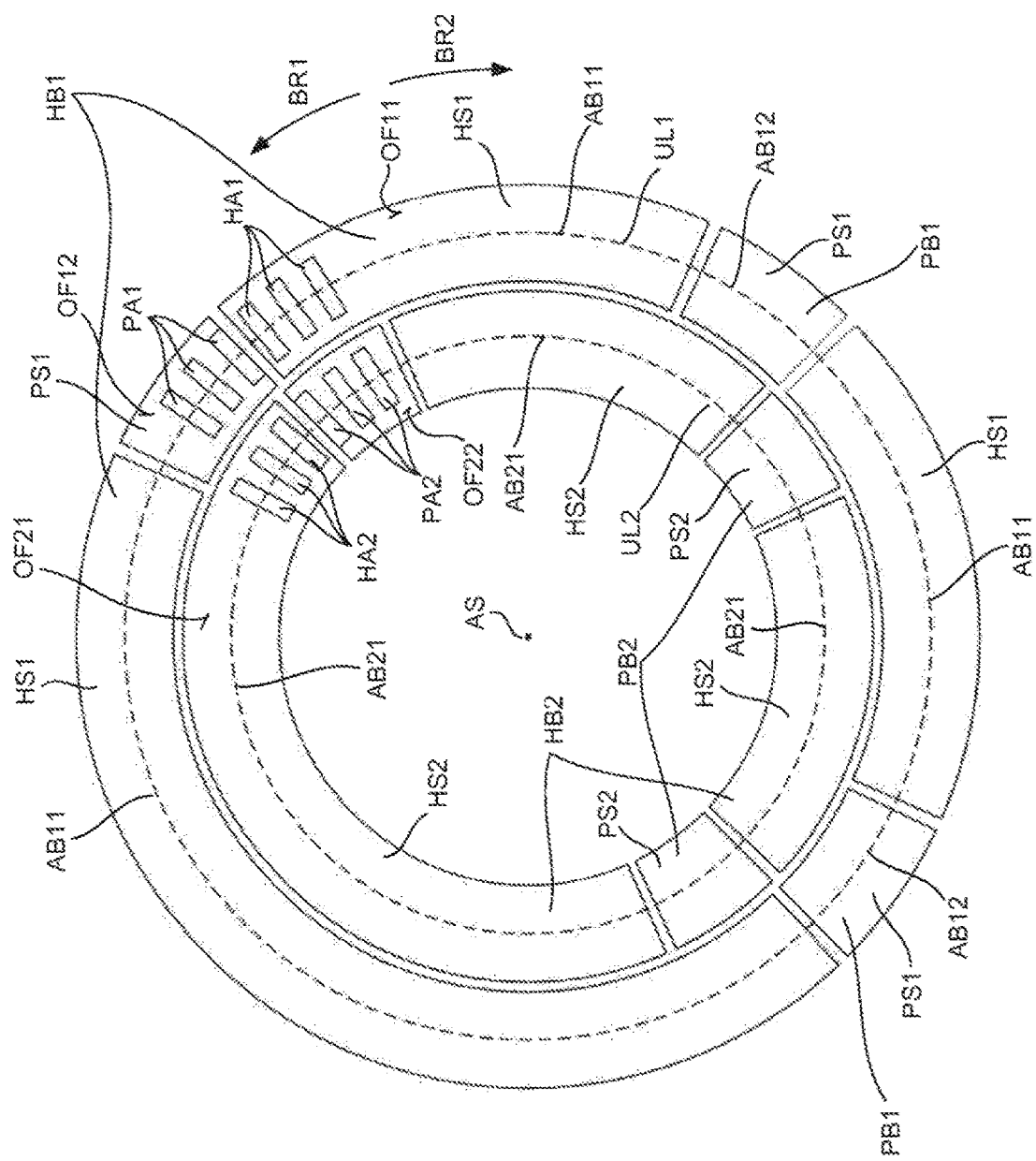
FIG. 2 is a schematic bottom view of main bending devices and partial bending devices of the exemplary apparatus of FIG. 1.

Since the apparatus V has been roughly described with reference to FIG. 1, the two main bending devices HB1, HB2 and the two partial bending devices PB1, PB2 will be described in further detail below with reference to FIG. 2. FIG. 2 shows a bottom view of the main and partial bending devices HB1, HB2, PB1, PB2.

The first main bending device HB1 includes three main bending sections HS1. The three main bending sections HS1 are composed of, for example, a metal or a metal alloy. Here, the main bending sections HS1 form three sections of a first "virtual" hollow cylinder and are arranged along three first sections AB11 of a first circular "virtual" circumferential line UL1 as viewed in the direction of the rotation axis AS. In some examples, the first main bending sections HS1 are connected to one another by means of connecting elements, not illustrated in the figure. For example, the first main bending sections can be bidirectionally rotated in relation to one another synchronously about the rotation axis AS in a manner driven by the rotary drive device DA and can be moved in a linear manner in relation to one another synchronously in the direction of the rotation axis AS in a manner driven by the linear drive device LA.

The first partial bending device PB1 includes three partial bending sections PS1 that are composed of, for example, a metal or a metal alloy. Here, the partial bending sections PS1 form three sections of a first hollow cylinder and are arranged along three second sections AB12 of the first circumferential line UL1 as viewed in the direction of the rotation axis AS. In some examples, the first partial bending sections PS1 are likewise connected to one another by means of connecting elements, not illustrated in the figure. For example, the first partial bending sections can be unidirectionally rotated in relation to one another synchronously about the rotation axis AS in a manner driven by the rotary drive device DA and can be moved in a linear manner in relation to one another synchronously in the direction of the rotation axis AS in a manner driven by the linear drive device LA.

In some implementations, the three main bending sections HS1 and the three partial bending sections PS1 are arranged alternately in relation to one another in the direction of the first circumferential line UL1.

In some examples, the number of main and partial bending sections HS1, PS1 is determined by the number of current phases of the winding support WT, or of the stator, this number generally being three. In general, in each case one winding is provided for each of the three current phases. In order to form each individual winding, a main and a partial bending section HS1, PS1 are needed in each case. When there are three current phases and therefore three windings, there are therefore three main and partial bending sections HS1, PS1. If two or more windings are provided for each of the three current phases, six or 3*n (that is to say a multiple of three) main and partial bending sections HS1, PS1 are needed. This also applies in a similar way for main and partial bending sections HS2, PS2 which will be described below.

The first main bending device HB1 may include a large number of main locking elements HA1 that are in the form of recesses formed on respective surfaces OF11 of the main bending sections HS1. The respective surfaces OF11 face the holding device HE. For example, three of the main locking elements HA1 are illustrated in Figure. In some examples, the main locking elements HA1 are arranged at a distance from one another along the first circumferential line UL1 and in accordance with the lateral distances between the pole slots of a winding support WT which will be described below. Furthermore, the main locking elements HA1 may be designed in such a way that end sections EA1 of first winding segments WS1, which will be described below, can be inserted into the respective corresponding main locking elements HA1 such that they fit and can be firmly held by the respective main locking elements HA1.

Similarly, in some examples, the first partial bending device PB1 includes a large number of partial locking elements PA1 which are likewise in the form of recesses that are formed on respective surfaces OF12 of the partial bending sections PS1. The respective surfaces OF12 face the holding device HE. For example, FIG. 2 illustrates three of the partial locking elements PA1. As shown, the partial locking elements PA1 are arranged at a distance from one another along the first circumferential line UL1 and in accordance with the lateral distances between the pole slots of the winding support WT. Furthermore, the partial locking elements PA1 may be designed in such a way that end sections EA2 of second winding segments WS2, which are to be described below, can be inserted into the respective corresponding partial locking elements PA1 such that they fit and can be firmly held by the respective partial locking elements PA1.

The second main bending device HB2 may likewise include three main bending sections HS2 which are composed of, for example, a metal or a metal alloy. Here, the main bending sections HS2 form three sections of a second "virtual" hollow cylinder, which is coaxial with the first hollow cylinder, and are arranged along three first sections AB21 of a second circular "virtual" circumferential line UL2 as viewed in the direction of the rotation axis AS. These main bending sections HS2 are connected to one another by means of connecting elements, not illustrated in the figure, such that the main bending sections may be bidirectionally rotated in relation to one another synchronously about the rotation axis AS in a manner driven by the rotary drive device DA and can be moved in a linear manner in relation to one another synchronously in the direction of the rotation axis AS in a manner driven by the linear drive device LA.

The second partial bending device PB2 may likewise include three partial bending sections PS2 which are composed of, for example, a metal or a metal alloy. Here, the partial bending sections PS2 form three sections of the second hollow cylinder and are arranged along three second sections AB22 of the second circumferential line UL2 as viewed in the direction of the rotation axis AS. These partial bending sections PS2 are likewise connected to one another by means of connecting elements, not illustrated in the figure, such that said partial bending sections may be unidirectionally rotated in relation to one another synchronously about the rotation axis AS in a manner driven by the rotary drive device DA and may be moved in a linear manner in relation to one another synchronously in the direction of the rotation axis AS in a manner driven by the linear drive device LA.

In some examples, as shown, the three main bending sections HS2 and the three partial bending sections PS2 are arranged alternately in relation to one another in the direction of the second circumferential line UL2.

The second main bending device HB2 includes a large number of main locking elements HA2 that are in the form of recesses that are formed on respective surfaces OF21, which face the holding device HE, of the main bending sections HS2 (three of the main locking elements HA2 are illustrated in FIG. 2 by way of example). In some examples, the main locking elements HA2 may be arranged at a distance from one another along the second circumferential line UL2 and in accordance with the lateral distances between the pole slots of the winding support WT. Furthermore, the main locking elements HA2 may be designed in such a way that end sections of winding segments, which are to be described below, may be inserted into the respective corresponding main locking elements HA2 such that they fit and can be firmly held by the respective main locking elements HA2.

Similarly, the second partial bending device PB2 may include a large number of partial locking elements PA2 which are likewise in the form of recesses which are formed on respective surfaces OF22, which face the holding device HE, of the partial bending sections PS2 (three of the partial locking elements PA2 are illustrated in FIG. 2 by way of example). Here, the partial locking elements PA2 are arranged at a distance from one another along the second circumferential line UL2 and in accordance with the lateral distances between the pole slots of the winding support WT. Furthermore, the partial locking elements PA2 are designed in such a way that end sections of winding segments, which are to be described below, can be inserted into the respective corresponding partial locking elements PA2 such that they fit and can be firmly held by the respective partial locking elements PA2.

Figure 3:
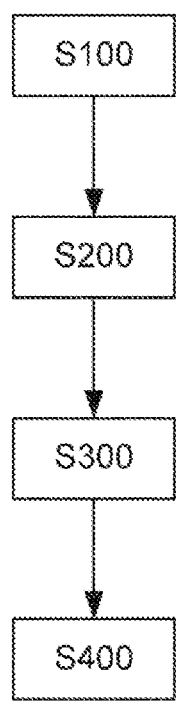
FIG. 3 is a schematic view of an exemplary arrangement of operations of a method for bending winding segments.

Since the apparatus V for bending winding segments WS1, WS2 has been described in detail with reference to FIGS. 1 and 2, a corresponding method for bending winding segments WS1, WS2 will be described in greater detail below with reference to FIGS. 3 and 4A to 4D. FIG. 3 shows the sequence of the method using a schematic flowchart.

FIGS. 4A to 4D are each schematic illustrations of sections of the main bending device HB1 and of the partial bending device PB1 of the apparatus V and three of the first and three of the second winding segments WS1, WS2 before, during and after respective method steps of said method.

In order to produce windings of the winding support WT, a large number of winding pins are inserted into corresponding pole slots, which are provided for them, of a hollow-cylindrical laminated core. The winding pins are of hairpin-shaped design and each have two bar-like limbs. The two limbs of the respective winding pins are interleaved and interlocked by a spreading step by means of a winding step of the winding support and inserted into the corresponding pole slots in accordance with the winding step of the winding support WT, wherein a region of the respective winding segments, together with an exposed end section, protrudes out of the laminated core in each case. These limbs serve for forming windings and are therefore called winding segments in the text which follows.

As an alternative to the winding pins which are in the shape of hairpins, bar or I-like winding bars may also be used for forming windings, the winding bars then serving as winding segments for forming windings.

As viewed from the cylinder axis of the laminated core in the radial direction, a winding segment of a winding pin and a winding segment of a further winding pin are therefore arranged radially one behind the other in each of the pole slots. Here, the two winding segments are electrically insulated from one another and from the laminated core by an insulation means, such as an insulating paper for example.

Those winding segments of the respective two winding segments in the respective pole slots which are situated at a further distance from the cylinder axis lie on a first "virtual" circle around the cylinder axis as viewed in the direction of the cylinder axis, wherein the first circle and the abovementioned first circumferential line UL1 have the same shape. These winding segments are called outer winding segments WS1, WS2 in the text which follows.

A first group of outer winding segments, which form a large number of the outer winding segments and serve exclusively for forming windings, are called first winding segments WS1 in the text which follows. A second group of outer winding segments, which form a small number of the outer winding segments and, in addition to forming windings, further serve for establishing electrical connections to external current lines, are called second winding segments WS2 in the text which follows.

In some examples, those winding segments of the respective two winding segments in the respective pole slots which are situated at a closer to the cylinder axis lie on a second "virtual" circle, which is concentric in relation to the first circle, around the cylinder axis as viewed in the direction of the cylinder axis, wherein the second circle and the abovementioned second circumferential line UL2 have the same shape. These winding segments are called inner winding segments in the text which follows.

A first group of inner winding segments, which form a large number of the inner winding segments and serve exclusively for forming windings, are called third winding segments in the text which follows. A second group of inner winding segments, which form a small number of the inner winding segments and, in addition to forming windings, further serve for establishing electrical connections to external current lines, are called fourth winding segments in the text which follows.

After the winding segments are inserted into the corresponding pole slots, the respective regions which protrude out of the laminated core form respective bending regions of the winding segments together with the respective exposed end sections.

In order to form windings, the bending regions BB1, BB2 of the outer winding segments WS1, WS2 are bent along the first circumferential line UL1, which corresponds to the first "virtual" circle, in a bending direction BR2 in a manner which will be described below. Accordingly, the bending regions of the inner winding segments are bent in a similar way to the bending regions BB1, BB2 of the outer winding segments WS1, WS2 along the second circumferential line UL2, which corresponds to the second "virtual" circle, in a bending direction which is opposite to the bending direction of the outer winding segments WS1, WS2.

To this end, the winding support WT, together with the winding segments WS1, WS2, is initially held in a stationary manner by the holding device HE concentrically in relation to the holding device HE.

The first exposed end sections EA1 of the first winding segments WS1 are then locked in line with method step S100. To this end, the control device SE outputs a first control signal to the linear drive device LA and prompts said linear drive device to move the main bending device HB1 axially in relation to the holding device HE in direction SR. Owing to the axial movement of the main bending device HB1, the first main locking elements HA1, which are in the form of recesses, are lowered onto the end sections EA1. In the process, the main bending device HB1 receives the corresponding end sections EA1 and firmly holds said end sections (compare with FIG. 4A).

While the end sections EA1 are firmly held by the main locking elements HA1, the first winding segments WS1 are bent at the respective bending regions BB1 in a first bending direction BR1 along the circumferential line UL1 in line with a further method step S200. To this end, the control device SE outputs a second control signal to the rotary drive device DA and prompts said rotary drive device to rotate the main bending device HB1 about the rotation axis AS in relation to the holding device HE. Owing to the rotary movement of the main bending device HB1, the winding segments WS1 are bent at the respective bending regions BB1 (compare with FIG. 4B).

The end sections EA2 of the second winding segments WS2 are then locked in line with a further method step S300, while the end sections EA1 of the first winding segments WS1 continue to be firmly held. To this end, the control device SE outputs a third control signal to the linear drive device LA and prompts said linear drive device to move the partial bending device PB1 axially in relation to the holding device HE in direction SR. Owing to the axial movement of the partial bending device PB1, the first partial locking elements PA1, which are likewise in the form of recesses, are lowered onto the end sections EA2 of the second winding segments WS2. In the process, the partial locking elements PA1 receive the corresponding end sections EA2 of the second winding segments WS2 and firmly hold said end sections (compare with FIG. 4C).

While the end sections EA1, EA2 are firmly held by the respective corresponding main and partial locking elements HA1, PA1, the first and the second winding segments WS1, WS2 are bent at the respective bending regions BB1, BB2 in a second bending direction BR2, which is opposite to the first bending direction BR1, along the circumferential line UL1 in line with a further method step S400. To this end, the control device SE outputs a fourth control signal to the rotary drive device DA and prompts said rotary drive device to rotate the main and partial bending device HB1, PB1 about the rotation axis AS in relation to the holding device HE. Owing to the rotary movement of the main and partial bending device HB1, PB1, the winding segments WS1, WS2 are bent at the respective bending regions BB1 (compare with FIG. 4D).

Figure 4A:
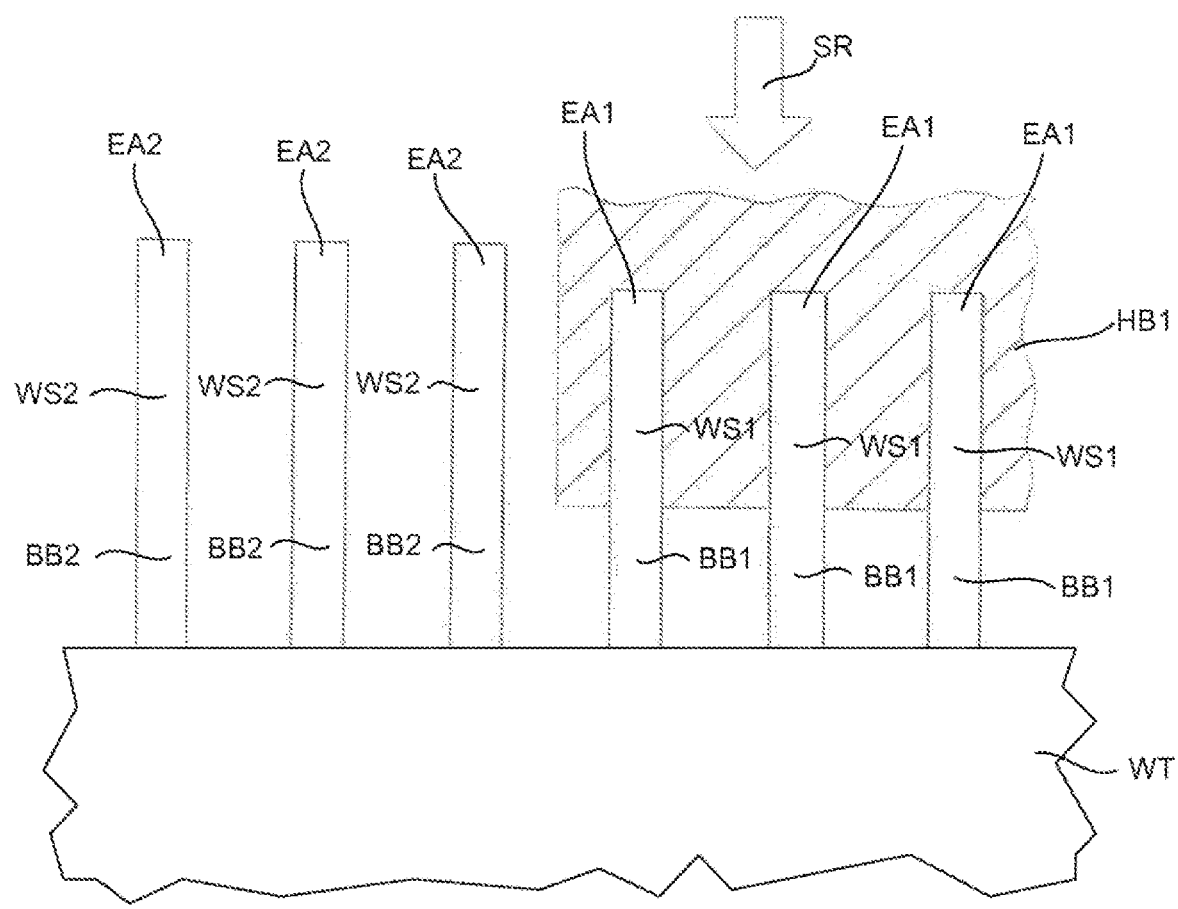
FIGS. 4A-4D are schematic views of the exemplary apparatus of FIG. 1 and intermediates of a winding support during production of the winding support in line with each method step according to the method illustrated in FIG. 3.
Figure 4B:
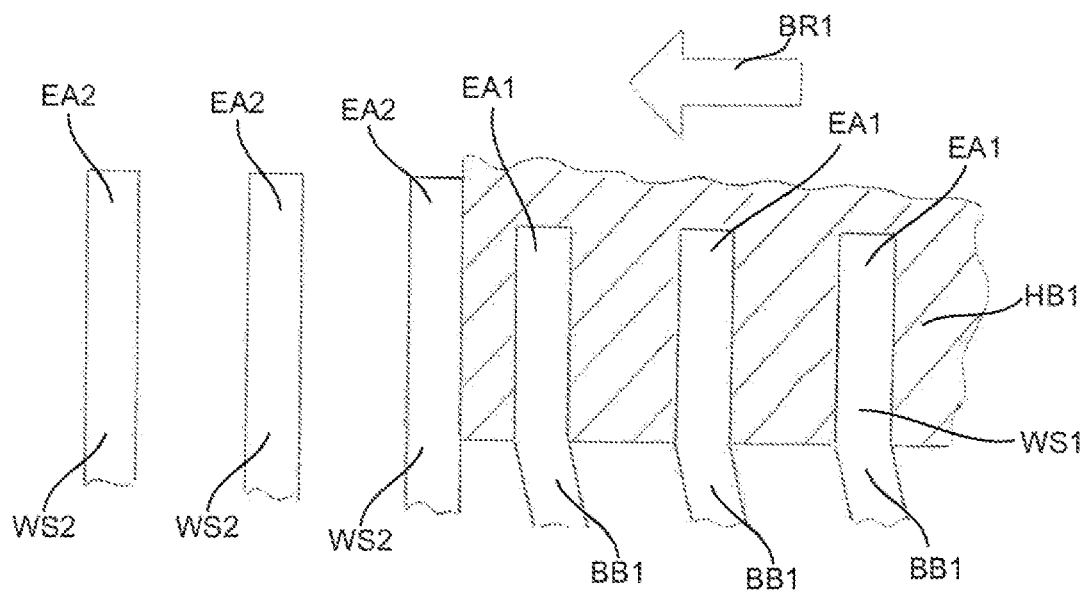
Figure 4C:
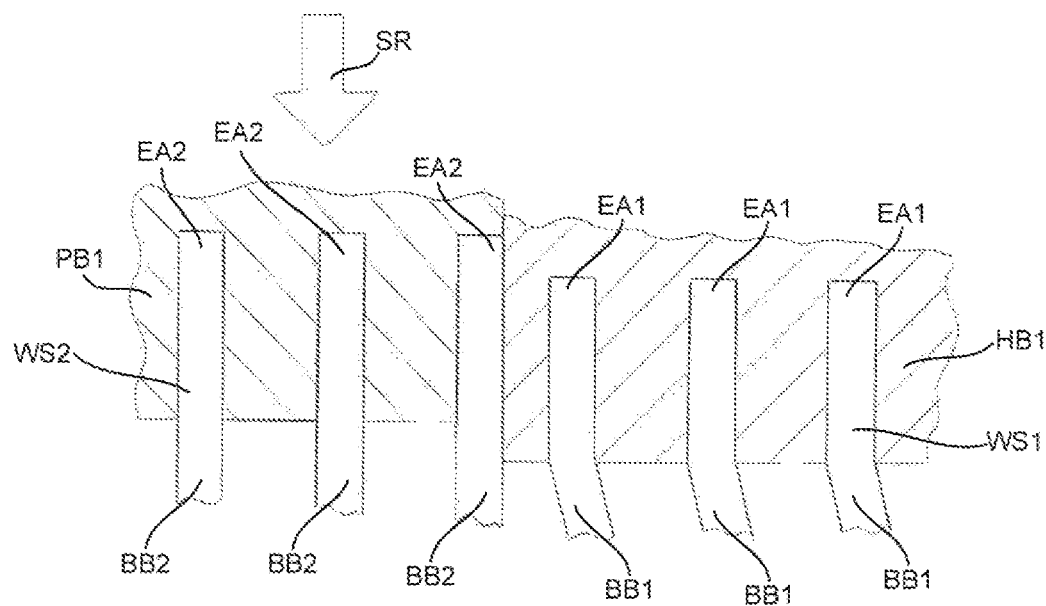
Figure 4D:
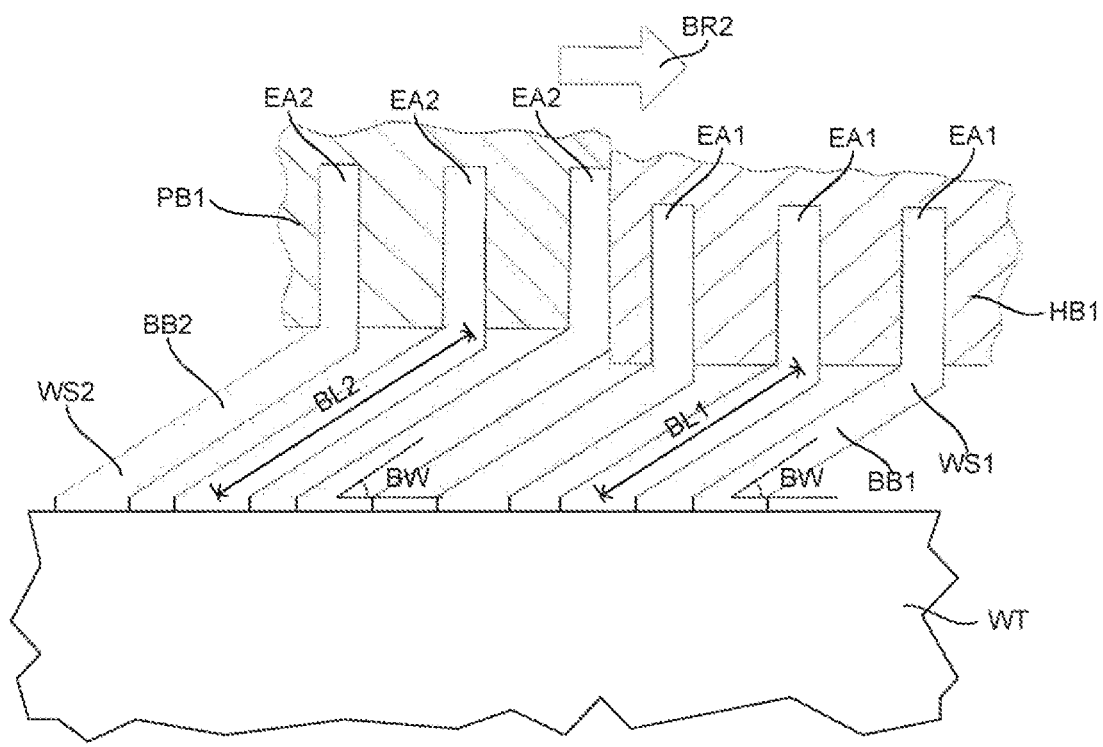

Owing to the bending of the first winding segments WS1 in the first bending direction BR1 and owing to the subsequent further bending of the first and the second winding segments WS1, WS2 in the opposite bending direction BR2, the first and the second winding segments WS1, WS2 are bent with different bending lengths BL1, BL2 but by the same ultimate bending angle BW (compare FIG. 4D). As a result, the winding segments WS1, WS2 may be bent further than winding segments which are all bent only in one bending direction in a single bending process. The winding support WT with winding segments WS1, WS2 which are bent further in such a way therefore has a winding head with a low winding head height.

In some examples, the inner winding segments are likewise bent with different bending lengths but by the same ultimate bending angle.

In some implementations, a first group of inner winding segments, which, like the first outer winding segments WS1, serve exclusively for forming windings, are firmly held by the main locking elements HA2 of the second main bending device HB2 in line with method step S100 and bent at the respective bending regions in line with method step S200. In the process, the first inner winding segments are bent in a bending direction that is opposite to the first bending direction BR1 of the first outer winding segments WS1. A second group of inner winding segments, which, like the second outer winding segments WS2, in addition to forming windings, may further serve for establishing electrical connections to the external current lines, is firmly held by the partial locking elements PA2 of the second partial bending device PB2 in line with method step S300. Subsequently, the first and the second inner winding segments are bent in a bending direction that is opposite to the second bending direction BR2 of the outer winding segments WS1, WS2, in line with method step S400.

After the bending process, the end sections EA1 of the first outer winding segments WS1 are electrically connected to the end sections of the respective first inner winding segments, which are arranged at a distance from the respective first outer winding segments WS1 in line with the winding step, by soldering or welding connection. The end sections EA2 of the second outer winding segments WS2 and the end sections of the second inner winding segments are electrically connected to the external current lines by soldering or welding connection.

A number of implementations have been described. Nevertheless, it will be understood that various modifications may be made without departing from the spirit and scope of the disclosure. Accordingly, other implementations are within the scope of the following claims.

What is claimed is:

1. An apparatus for bending a plurality of winding segments for forming a winding of a winding support of an electrical machine, the apparatus comprising:
  a main bending device comprising a number of main locking elements that face a holding device and are arranged along first sections of a circumferential line, the circumferential line runs around an axis, the main locking elements are designed to lock exposed end sections of first winding segments and to bend the first winding segments at a first bending region, the holding device holding the winding support in which winding segments are arranged;
  a partial bending device comprising a number of partial locking elements that face the holding device and are arranged along second sections of the circumferential line and are designed to lock exposed end sections of second winding segments and to bend the second winding segments at a second bending region, the circumferential line extending through the number of main locking elements and the number of partial locking elements;
  wherein the holding device rotates in relation to the main bending device and the partial bending device;
  wherein the first winding segments at the first bending region are bent by a bending angle, and the second winding segments at the second bending region are bent by the bending angle;
  wherein the first winding segments at the first bending region are bent at a first bending length at the bending angle being between the winding support and the main bending device; and
  wherein the second winding segments at the second bending region are bent at a second bending length at the bending angle being between the winding support and the partial bending device;
  wherein the first bending length and the second bending length are different.

2. The apparatus of claim 1, wherein the holding device and the main bending device are designed such that the holding device and the main bending device can rotate bidirectionally in relation to one another.

3. The apparatus of claim 1, wherein the holding device and the partial bending device are designed such that the holding device and the main bending device can rotate unidirectionally in relation to one another.

4. The apparatus of claim 1, wherein the circumferential line is in a shape of an ellipse, wherein the axis passes through a center of the ellipse.

5. The apparatus of claim 1, wherein the circumferential line is in a shape of a circle, wherein the axis passes through a center of the circle.

6. The apparatus of claim 1, wherein the main locking elements and/or partial locking elements are in a form of gripping elements or in a form of recesses into which end sections of the winding segments can be inserted such that the end sections of the winding segments fit.

7. The apparatus of claim 1, further comprising a rotary drive device designed to rotate the holding device, the main bending device and/or the partial bending device in relation to one another about the axis.

8. The apparatus of claim 1, further comprising a linear drive device designed to move the holding device, the main bending device and/or the partial bending device independently of one another in a direction of the axis.

* * * * *